US009940064B2

(12) United States Patent
Baron et al.

(10) Patent No.: US 9,940,064 B2
(45) Date of Patent: Apr. 10, 2018

(54) LIVE MIGRATION OF VIRTUAL DISKS

(71) Applicant: Red Hat Israel, Ltd., Raanana (IL)

(72) Inventors: Ayal Baron, Kiryat Ono (IL); Federico Simoncelli, Fano (IT)

(73) Assignee: Red Hat Israel, Ltd., Raanana (IL)

( * ) Notice: Subject to any disclaimer, the term of this patent is extended or adjusted under 35 U.S.C. 154(b) by 34 days.

(21) Appl. No.: 14/996,417

(22) Filed: Jan. 15, 2016

(65) Prior Publication Data
US 2016/0124680 A1 May 5, 2016

Related U.S. Application Data

(63) Continuation of application No. 13/852,598, filed on Mar. 28, 2013, now Pat. No. 9,239,689.

(51) Int. Cl.
G06F 13/00 (2006.01)
G06F 3/06 (2006.01)
G06F 11/20 (2006.01)
G06F 11/14 (2006.01)

(52) U.S. Cl.
CPC ............ *G06F 3/0647* (2013.01); *G06F 3/065* (2013.01); *G06F 3/067* (2013.01); *G06F 3/0614* (2013.01); *G06F 3/0619* (2013.01); *G06F 3/0631* (2013.01); *G06F 3/0632* (2013.01); *G06F 3/0643* (2013.01); *G06F 3/0664* (2013.01); *G06F 3/0671* (2013.01); *G06F 11/1451* (2013.01); *G06F 11/1456* (2013.01); *G06F 11/2074* (2013.01)

(58) Field of Classification Search
None
See application file for complete search history.

(56) References Cited

U.S. PATENT DOCUMENTS

| 6,795,966 | B1 * | 9/2004 | Lim ................... G06F 11/1438 718/1 |
| 8,738,870 | B1 * | 5/2014 | Balasubramanian ... G06F 12/16 711/161 |
| 2005/0256972 | A1 | 11/2005 | Cochran et al. |
| 2006/0195493 | A1 | 8/2006 | Chang et al. |
| 2009/0037680 | A1 * | 2/2009 | Colbert ................. G06F 3/0617 711/162 |

(Continued)

OTHER PUBLICATIONS

USPTO, Office Action for U.S. Appl. No. 13/852,598, dated Jan. 15, 2015.

(Continued)

*Primary Examiner* — Duc Doan
(74) *Attorney, Agent, or Firm* — Lowenstein Sandler LLP

(57) ABSTRACT

Live migration of a virtual disk of a virtual machine between storage devices is described. In accordance with one example, a computer system prepares a first area of a first storage device and a second area of a second storage device for a live snapshot of a virtual disk of a virtual machine. A transaction is then executed that includes storing the live snapshot in the first area of the first storage device, copying the live snapshot to the second area of the second storage device, and mirroring a change to the virtual disk that occurs after the creation of the live snapshot, where the mirroring is via one or more write operations to the live snapshot in the first area and to the copy of the live snapshot in the second area.

20 Claims, 5 Drawing Sheets

(56) References Cited

U.S. PATENT DOCUMENTS

| | | | |
|---|---|---|---|
| 2011/0066786 A1* | 3/2011 | Colbert | G06F 9/45558 711/6 |
| 2011/0208908 A1 | 8/2011 | Chou et al. | |
| 2012/0137098 A1* | 5/2012 | Wang | G06F 3/0617 711/165 |
| 2012/0221612 A1* | 8/2012 | Zachariassen | G06F 17/30067 707/827 |
| 2012/0284234 A1* | 11/2012 | Mashtizadeh | G06F 17/30233 707/655 |

OTHER PUBLICATIONS

USPTO, Final Office Action for U.S. Appl. No. 13/852,598, dated May 15, 2015.

USPTO, Notice of Allowance for U.S. Appl. No. 13/852,598, dated Sep. 17, 2015.

\* cited by examiner

LIVE MIGRATION OF VIRTUAL DISKS

REFERENCE TO RELATED APPLICATION

This application is a continuation of application Ser. No. 13/852,598, filed on Mar. 28, 2013, the entirety of which is incorporated herein by reference.

TECHNICAL FIELD

This disclosure relates to computer systems, and more particularly, to live migration of a virtual disk of a virtual machine.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps to a device of the host machine (e.g., a network interface device, a CD-ROM drive, etc.). For example, a virtual machine may comprise a virtual disk that is mapped to an area of storage (known as a "disk image") of a particular storage device (e.g., a magnetic hard disk, a Universal Serial Bus [USB] solid state drive, a Redundant Array of Independent Disks [RAID] system, a network attached storage [NAS] array, etc.) The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
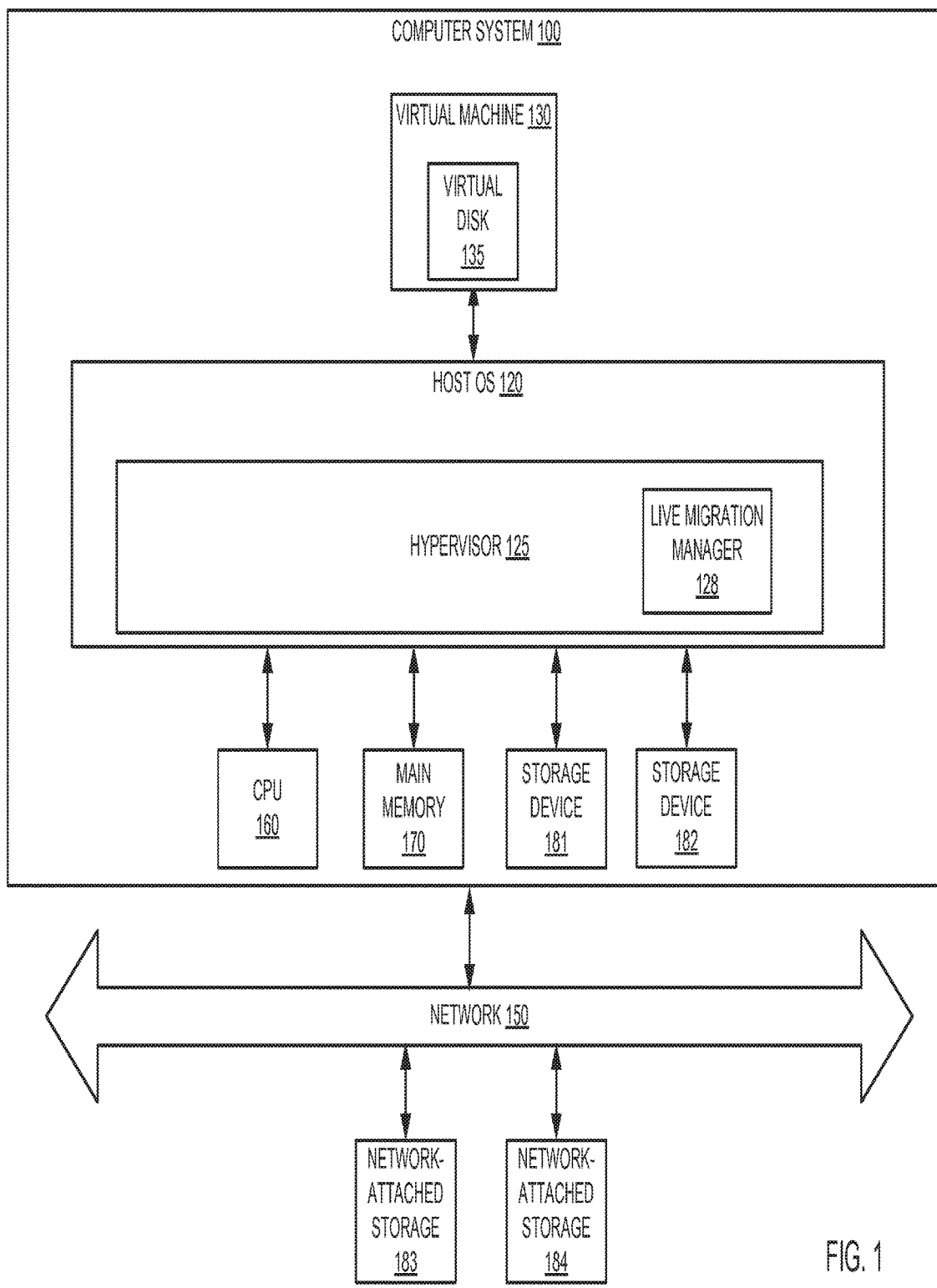
FIG. 1 depicts an illustrative system architecture, in accordance with the present disclosure.

Described herein is a system and method by which a computer system performs live migration of a virtual disk of a virtual machine (VM). In live migration, a mapping from a virtual disk of a VM to a storage device is changed while the VM is executing. In other words, prior to the live migration, a virtual disk is mapped to a particular storage device (the "source" storage device), and after the live migration, the virtual disk is mapped to a different storage device (the "target" storage device). For example, a hypervisor may have an open file descriptor on the source device only prior to the live migration, an open file descriptor on the target device only after the live migration (if successful), and both open file descriptors during at least a portion of the live migration. When data is written to disk by the VM, the data is sent to the appropriate store (i.e., to the source device prior to the live migration, to the target device after the live migration, and to both the source and target devices when the hypervisor has open file descriptors for both devices.

In order for migration to be performed "live" (i.e., while the VM is executing), changes that occur to the virtual disk during the migration process (e.g., write operations to the virtual disk, formatting commands for the virtual disk, etc.) should be properly captured in the target area (i.e., the area of the target storage device to which the virtual disk is mapped), or else there will be an inconsistency between the virtual disk and the target area. In accordance with one example, live migration is performed using snapshots. A snapshot of a virtual disk of a VM is a file that captures the state of the virtual disk at a particular point in time. A live snapshot of a virtual disk of a VM is a snapshot that is taken while the VM is executing (i.e., a snapshot that is taken without first shutting down the VM).

In accordance with one embodiment, a computer system prepares a first area of a first storage device and a second area of a second storage device for a live snapshot of a virtual disk of a virtual machine. A transaction is then executed that comprises: storing the live snapshot in the first area of the first storage device, copying the live snapshot to the second area of the second storage device, and mirroring any changes to the virtual disk that occur after the time at which the live snapshot was created, where the mirroring is via one or more write operations to the live snapshot in the first area and to the copy of the live snapshot in the second area. In one example, the copying and mirroring of the transaction may be executed concurrently (e.g., by a first process that performs the copying and a second process that performs the mirroring, etc.); in addition, the mirroring itself may be performed by multiple processes (e.g., a process writing to the first area and a process writing to the second area, etc.), and the copying itself may also be performed by multiple processes.

If the transaction executes successfully, the virtual disk is mapped to the second area of the second storage device. Otherwise, in one example, if the transaction does not execute successfully (i.e., any of the storing, copying or mirroring failed), then the copy of the live snapshot in the second area (if the live snapshot was in fact copied during the failed transaction) is deleted, the first area and second area are deallocated, and the mapping of the virtual disk remains unchanged. In addition, the live snapshot in the first area (if it was in fact stored in the first area during the failed transaction) may or may not be deleted, depending on the particular implementation. In another example, when the mirroring portion of the transaction fails, but both the storing and the copying were successfully executed during the failed transaction, the write operation(s) of the mirroring are rolled back and the virtual disk is mapped to the first area of the first storage device.

The techniques of the present disclosure can thus enable a computer system to migrate a virtual disk of a virtual machine from one storage device to another storage device, without requiring shutdown of the virtual machine, and without losing any updates to the virtual disk that may occur during the migration. The capability to perform such live migration can facilitate administrative tasks such as upgrading storage, performing maintenance activities, backups, etc., as well as performance-enhancing features such as load balancing. In addition, this capability can be used to move virtual disks to a more capacious storage device, or to intentionally degrade performance because a virtual disk is on expensive storage that is not utilized properly (e.g., wasting expensive storage space, etc.), or to move virtual disks from local storage to shared storage and vice versa. It should be noted that although the techniques of the present disclosure are disclosed in the context of two storage devices (i.e., a source storage device and a target storage device), they can also be used to migrate a live VM from one position to another position on the same physical storage device.

FIG. 1 depicts an illustrative architecture of a computer system 100, in accordance with an example of the present invention. It should be noted that other architectures for computer system 100 are possible, and that examples of a system utilizing the disclosure are not necessarily limited to the specific architecture depicted by FIG. 1.

As shown in FIG. 1, the computer system 100 is connected to a network 150 and comprises central processing unit (CPU) 160, main memory 170, which may include volatile memory devices (e.g., random access memory (RAM)), non-volatile memory devices (e.g., flash memory), and/or other types of memory devices, storage devices 181 and 182 (each of which may be a magnetic hard disk, a Universal Serial Bus [USB] solid state drive, etc.), and network-attached storage devices 183 and 184. The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that the fact that there are two "local" storage devices 181 and 182 and two network-attached storage devices 183 and 184 is merely illustrative, and in some other examples there may be a different number of storage devices and network-attached storage devices. It should further be noted that in some examples there may be only shared storage, or only local storage, rather than both. Furthermore, as noted above, the techniques disclosed below can also be used to move virtual disks from one position of a storage device to another position on the same storage device. The configuration depicted in FIG. 1, however, enables migration from a local storage device to a network-attached storage device, or from a network-attached storage device to a local storage device, or between two local storage devices, or between two network-attached storage devices. Similarly, although a single CPU is depicted in FIG. 1, in some other examples computer system 100 may comprise a plurality of CPUs.

Computer system 100 runs a host operating system (OS) 120 that manages the hardware resources of the computer system and provides functions such as interprocess communication, scheduling, virtual memory management, and so forth. In one example, host operating system 120 also comprises a hypervisor 125, which provides a virtual operating platform for one or more virtual machines 130 and manages execution of one or more virtual machines 130. In accordance with this example, hypervisor 125 includes a live migration manager 128 that is capable of creating live snapshots of virtual disks, preparing areas of storage devices for live snapshots, storing live snapshots in prepared areas of storage, mirroring changes to virtual disks, and executing transactions that perform live migration of virtual disks. Some operations of live migration manager 128 are described in detail below with respect to FIGS. 2 through 4. It should be noted that in some other examples, some pertinent functions of hypervisor 125 and live migration manager 128 may be distributed among many system components.

It should be noted that in some alternative examples, hypervisor 125 may be external to host OS 120, rather than embedded within host OS 120. It should further be noted that in some alternative examples, live migration manager 128 may be a module of host OS 120, rather than a module of hypervisor 125.

Virtual machine 130 is a software implementation of a machine that executes programs as though it were an actual physical machine. Virtual machine 130 comprises a virtual disk 135 that is mapped to a storage device (e.g., storage device 181, storage device 182, network-attached storage device 183, network-attached storage devices 184, etc.). Virtual machine 130 also comprises a guest operating system (not depicted in FIG. 1) that manages files and programs within the virtual machine, and one or more virtual processors (also not depicted in FIG. 1) that are mapped by hypervisor 125 to physical CPU(s) 160 of computer system 100. It should be noted that although, for simplicity, a single virtual disk 135 of virtual machine 130 is depicted in FIG. 1, in some examples virtual machine 130 may comprise a plurality of virtual disks. Similarly, although a single virtual machine 130 is depicted in FIG. 1, in some other examples computer system 100 may host a plurality of virtual machines. It should be further noted that the techniques disclosed below can be used with any file or disk, and not just virtual disks of a VM, when a hypervisor or host OS can control the I/O path (e.g., by getting between the writing process and the backing store, etc.).

Figure 2:
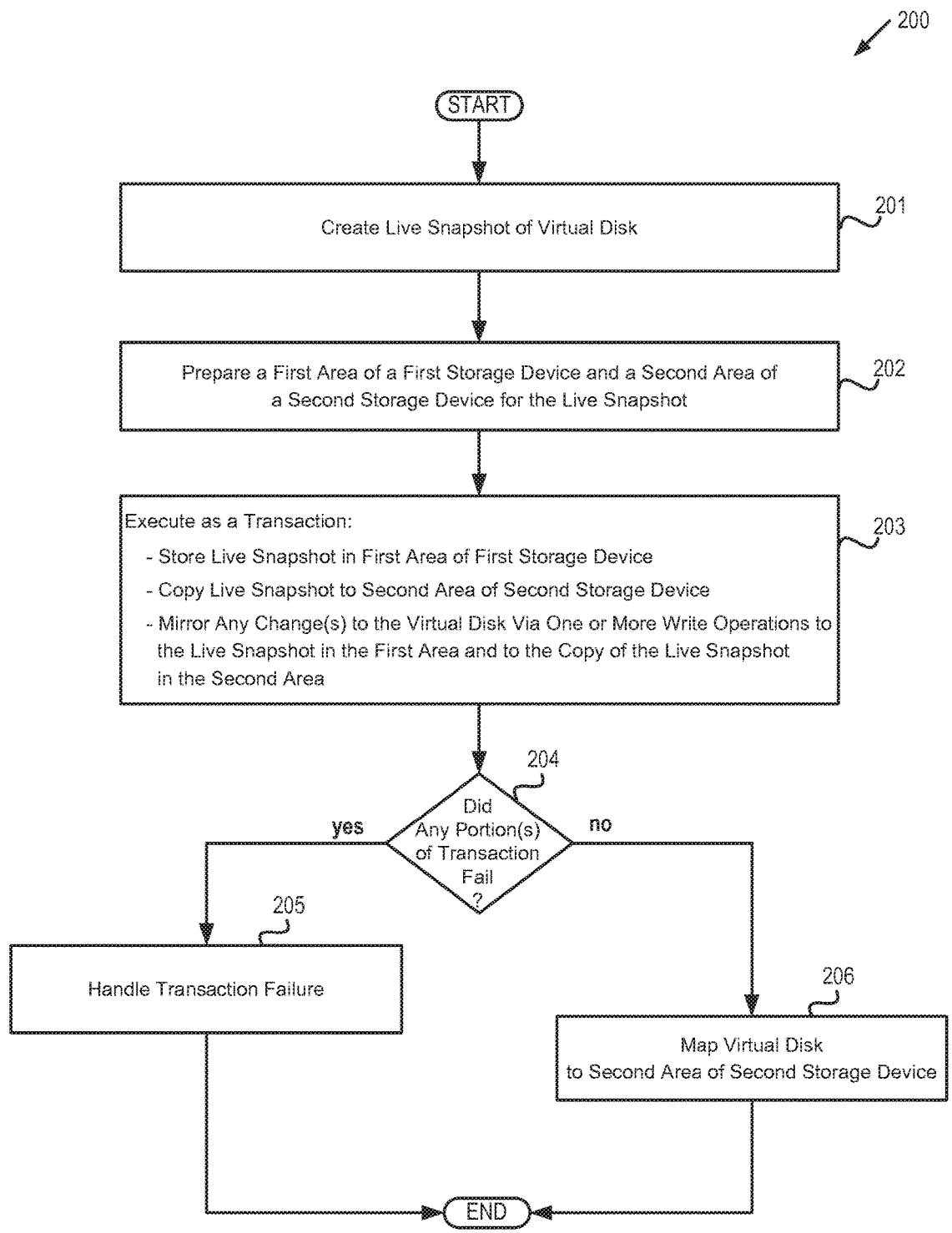
FIG. 2 depicts a flow diagram of one example of a method by which a computer system performs live migration of a virtual disk of a virtual machine.

FIG. 2 depicts a flow diagram of one example of a method 200 for performing live migration of a virtual disk of a virtual machine. The method is performed by processing logic that may comprise hardware (circuitry, dedicated logic, etc.), software (such as is run on a general purpose computer system or a dedicated machine), or a combination of both. In one example, the method is performed by the computer system 100 of FIG. 1, while in some other examples, some or all of the method might be performed by another machine.

At block 201, a live snapshot of virtual disk 135 of virtual machine 130 is created. In some embodiments, block 201 may be performed in response to an administrator submitting a command to computer system 100 (e.g., via a graphical user interface [GUI], etc.) to migrate virtual disk 135 from an existing storage device to a new storage device as part of a system upgrade, while in some other embodiments, block 201 may be performed as part of a scheduled job to migrate virtual disk 135 from one storage device to another, while in yet other embodiments, block 201 may be performed in response to some other event or activity (e.g., maintenance, backup, etc.). It should be noted that the source storage device may be either a network-attached storage device (e.g., network-attached storage device 183, network-attached storage device 184, etc.) or a storage device local to computer system 100 (e.g., storage device 181, storage device 182, etc.); similarly, the target storage device may be either a network-attached storage device or a storage device local to computer system 100.

In one example, when a storage device of computer system 100 (e.g., storage device 181, storage device 182, network-attached storage device 183, network-attached storage device 184, etc.) supports native snapshotting (e.g., a capability by which the storage device can create snapshots), the live migration manager 128 issues a request (e.g., a dedicated command, etc.) to a native snapshotting module on the storage device to create the snapshot. Alternatively (e.g., when none of the storage devices have a native snapshotting capability, etc.), the live migration manager 128 may issue a request to hypervisor 125 or host OS 120 to create the snapshot. In one example, live migration manager 128 may issue a query to one or more storage devices to determine whether there is a storage device that supports native snapshotting. In another example, live migration manager 128 may obtain this information from hypervisor 125 or host OS 120.

At block 202, a first area of a first storage device and a second area of a second storage device are prepared for the live snapshot. In one example, the preparation is performed by live migration manager 128 and comprises allocating and initializing the first and second storage areas. In one example, virtual disk 135 is mapped to an area of the first storage device prior to the preparing of the first and second storage areas.

At block 203 a transaction is executed, where the transaction comprises:
storing the live snapshot created at block 201 in the first area of the first storage device;
copying the live snapshot to the second area of the second storage device; and
mirroring any change(s) to the virtual disk since the creation of the live snapshot via one or more write operations to the live snapshot in the first area and to the copy of the live snapshot in the second area.

In one example, the mirroring is performed via a single write operation that performs the mirroring with respect to both the first area and the second area, while in another example, the mirroring is performed via two write operations (executed either concurrently or sequentially), one writing to the first area and one writing to the second area, while in yet another example, there may be a plurality of write operations to either or both of the first area and second area (for example, when there are a plurality of changes to virtual disk 135, each at a separate time).

In one example, the copying and mirroring of the transaction may be executed concurrently (e.g., by a first process that performs the copying and a second process that performs the mirroring), and the mirroring itself may be performed by multiple processes (e.g., a process writing to the first area and a process writing to the second area, etc.). In one example, the transaction is executed by live migration manager 128.

It should be noted that in some other embodiments, the virtual machine may receive a first request to initiate writing to the first area of the first storage (still part of the regular live snapshot implementation) and a second request to initiate mirroring of the writes to the second area in the second storage device—possibly, but not necessarily, as a transaction. In some such embodiments, if the two requests cannot be performed as a transaction, the hypervisor may synchronize data that may have been slipped between the two requests because they are not atomic.

Block 204 checks whether any portion(s) of the transaction failed (e.g., failure of the storing, failure of the copying, failure of at least one of the write operation(s) performed in the mirroring, etc.). If any such failure was detected, execution proceeds to block 205, otherwise execution proceeds to block 206.

At block 205, the transaction failure is handled. A first method for handling the transaction failure is described in detail below with respect to FIG. 3, while a second method for handling the transaction failure is described in detail below with respect to FIG. 4. At block 206, which is reached when the transaction executed successfully, virtual disk 135 is mapped to the second area of the second storage device, instead of to the area of the first storage device to which it was mapped prior to the live migration.

Figure 3:
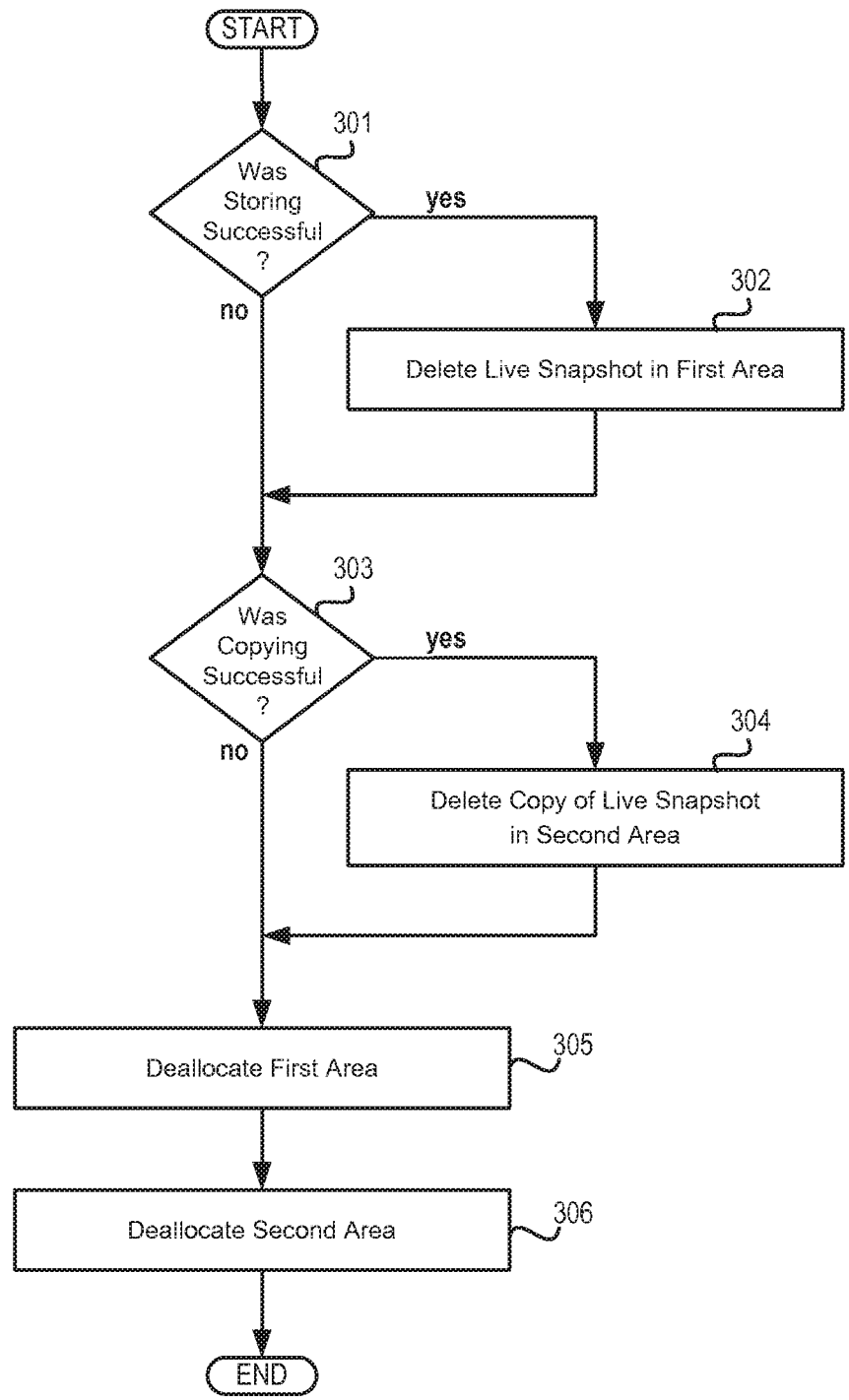
FIG. 3 depicts a flow diagram of an example of a first method by which a computer system handles a transaction failure during live migration.

FIG. 3 depicts a flow diagram of an example of a first method by which a computer system handles a transaction failure during live migration of a virtual disk of a virtual machine. The method is performed by processing logic that may comprise hardware (circuitry, dedicated logic, etc.), software (such as is run on a general purpose computer system or a dedicated machine), or a combination of both. In one example, the method is performed by the computer system 100 of FIG. 1, while in some other examples, some or all of the method might be performed by another machine. It should be noted that blocks depicted in FIG. 3 can be performed simultaneously or in a different order than that depicted.

Block 301 checks whether the storing of the live snapshot in the first area of the first storage device during the execution of the transaction of block 203 was successful. If so, execution proceeds to block 302, otherwise execution continues at block 303.

At block 302, the live snapshot that was stored in the first area of the first storage device is deleted. It should be noted that deletion implies that the changes are live merged within the first area (i.e., such writes cannot be lost since the VM is up and running).

Block 303 checks whether the copying to the second area of the second storage device during the execution of the transaction of block 203 was successful. If so, execution proceeds to block 304, otherwise execution continues at block 305.

At block 304, the copy of the live snapshot that was stored in the second area of the second storage device is deleted. At block 305, the first area of the first storage device is deallocated, enabling the area to be used for a subsequent live migration or any other storage. Similarly, the second area of the second storage device is deallocated at block 306. It should be noted that the deallocation of the first area is optional, and may not be performed in some examples (e.g., because such deletion is dependent on a live merge capability, etc.). After block 306, virtual disk 135 remains mapped to the same area of the first storage device as it was prior to the failed live migration attempt. It should be noted that in the event of any failure, the disk is always kept mapped to the first storage device.

Figure 4:
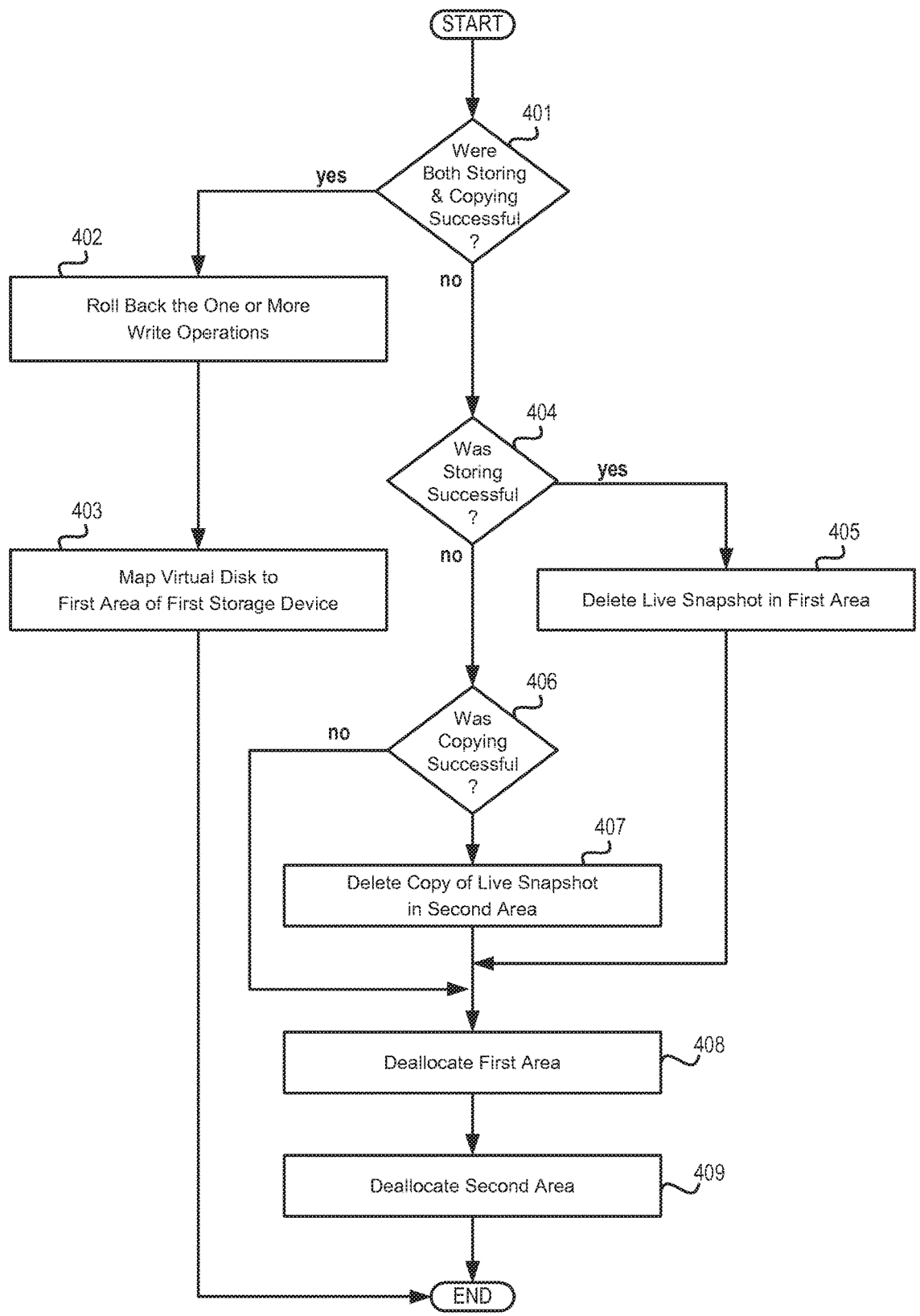
FIG. 4 depicts a flow diagram of an example of a second method by which a computer system handles a transaction failure during live migration.

FIG. 4 depicts a flow diagram of an example of a second method by which a computer system handles a transaction failure during live migration of a virtual disk of a virtual machine. The method is performed by processing logic that may comprise hardware (circuitry, dedicated logic, etc.), software (such as is run on a general purpose computer system or a dedicated machine), or a combination of both. In one example, the method is performed by the computer system 100 of FIG. 1, while in some other examples, some or all of the method might be performed by another machine. It should be noted that blocks depicted in FIG. 4 can be performed simultaneously or in a different order than that depicted.

Block 401 checks whether both the storing of the live snapshot in the first area of the first storage device and the mirroring of the live snapshot to the second area of the second storage device during the execution of the transaction of block 203 were successful. If so (which indicates that the failure occurred during the mirroring portion of the transaction executed at block 203), execution proceeds to block 402; otherwise, execution continues at block 404.

At block 402, the one or more write operations of the mirroring portion of the transaction of block 204 are rolled back. At block 403, virtual disk 135 is mapped to the first area of the first storage device.

Block 404 checks whether the storing of the live snapshot in the first area of the first storage device during the execution of the transaction of block 204 was successful. If so, execution proceeds to block 405, otherwise execution continues at block 406.

At block 405, the live snapshot that was stored in the first area of the first storage device is deleted. It should be noted that block 405 is optional, and in some other examples (e.g., when there is no live merge capability, etc.) this deletion may be omitted. After block 405, execution continues at block 408.

Block 406 checks whether the copying of the live snapshot to the second area of the second storage device during the execution of the transaction of block 204 was successful. If so, execution proceeds to block 407, otherwise execution continues at block 408.

At block 407, the copy of the live snapshot that was stored in the second area of the second storage device is deleted. At block 408, the first area of the first storage device is deallocated, and at block 409, the second area of the second storage device is deallocated. After block 409, virtual disk 145 remains mapped to the same area of the first storage device as it was prior to the failed live migration attempt. It should be noted that, as in the method of FIG. 3, in the event of any failure, the disk is always kept mapped to the first storage device.

Figure 5:
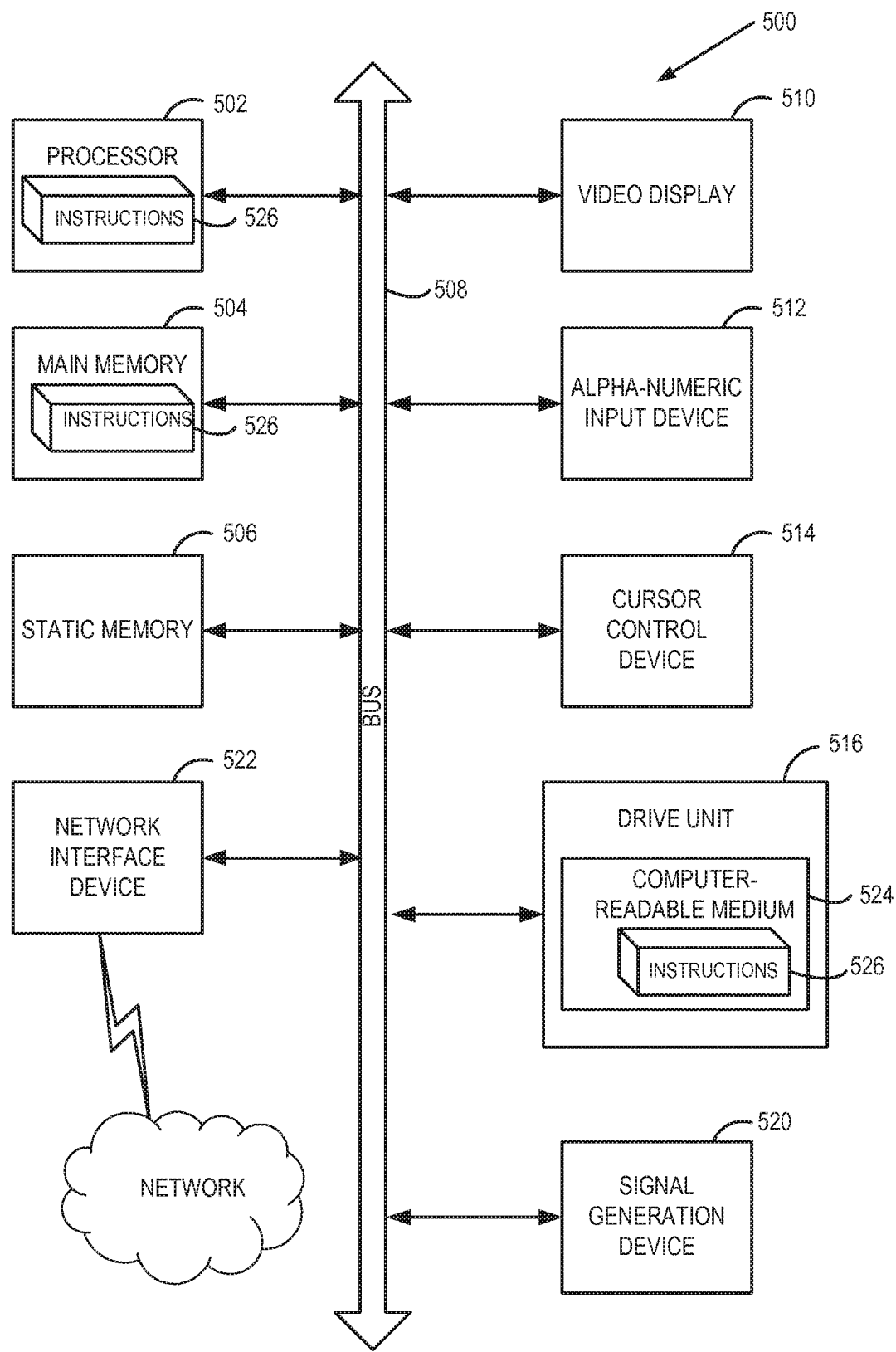
FIG. 5 depicts a block diagram of an illustrative computer system operating in accordance with examples of the invention.

FIG. 5 illustrates an illustrative computer system within which a set of instructions, for causing the machine to perform any one or more of the methodologies discussed herein, may be executed. In alternative examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 (e.g., instructions corresponding to the methods of FIGS. 2 through 4, etc.) embodying any one or more of the methodologies or functions described herein. Instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522.

While the computer-readable storage medium 524 is shown in an illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "preparing", "executing", "storing", "copying", "mirroring", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other examples will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    preparing, by a processor, a first area of a first storage device and a second area of a second storage device for snapshots of a virtual disk of a virtual machine;
    creating, during execution of the virtual machine, a snapshot of the virtual disk in the first area of the first storage device;
    copying the snapshot of the virtual disk to the second area of the second storage device;
    mirroring a change of the virtual disk that occurs after the snapshot is created, wherein the mirroring comprises executing one or more write operations to the copy of the snapshot in the second area; and
    mapping, during execution of the virtual machine, the virtual disk of the virtual machine to the copy of the snapshot in the second area to enable the virtual machine to operate using the copy of the snapshot after the mirroring.

2. The method of claim 1 further comprising detecting a failure in at least one of the copying or the mirroring.

3. The method of claim 2 further comprising deleting, in response to the detecting the failure, the snapshot in the first area and the copy of the snapshot in the second area.

4. The method of claim 2 further comprising rolling back, in response to the detecting the failure, the one or more write operations to the snapshot in the first area and to the copy of the snapshot in the second area.

5. The method of claim 1 wherein the preparing of the first area comprises allocating and initializing the first area.

6. The method of claim 1 wherein the one or more write operations comprises a first write operation to the first area and a second write operation to the second area, and wherein the first write operation and the second write operation are concurrent.

7. The method of claim 1 wherein the copying and mirroring are executed concurrently as a transaction.

8. The method of claim 7 wherein the virtual disk is mapped to the first storage device prior to the preparing and is mapped to the second storage device after the transaction comprising the copying and the mirroring executes successfully.

9. The method of claim 1, wherein creating the snapshot of the virtual disk comprises transmitting a request to the first storage device to create the first snapshot of the virtual disk in the first area of the first storage device.

10. An apparatus comprising:
    a memory to store a virtual machine comprising a virtual disk; and
    a processor, operatively coupled to the memory, to:
        prepare a first area of a first storage device and a second area of a second storage device for a snapshot of the virtual disk;
        create, during execution of the virtual machine, a snapshot of the virtual disk in the first area of the first storage device;
        copy the snapshot of the virtual disk to the second area of the second storage device;

mirror a change to the virtual disk that occurs after the snapshot is created, wherein the mirroring comprises executing one or more write operations to the copy of the snapshot in the second area; and map, during execution of the virtual machine, the virtual disk of the virtual machine to the copy of the snapshot in the second area to enable the virtual machine to operate using the copy of the snapshot after the mirroring.

11. The apparatus of claim 10 wherein the processor is further to detect a failure in at least one of the copying or the mirroring.

12. The apparatus of claim 11 wherein the processor is further to delete, in response to the detecting the failure, the snapshot in the first area and the copy of the snapshot in the second area.

13. The apparatus of claim 12 wherein the processor is further to roll back, in response to the detecting the failure, the one or more write operations to the copy of the snapshot in the second area.

14. The apparatus of claim 10 wherein the preparing of the first area comprises allocating and initializing the first area.

15. The apparatus of claim 10 wherein the one or more write operations comprises a first write operation to the first area and a second write operation to the second area, and wherein the first write operation and the second write operation are concurrent.

16. The apparatus of claim 10 wherein the copying and the mirroring occur as a transaction, and wherein the virtual disk is mapped to the first storage device prior to the preparing and is mapped to the second storage device after the transaction executes successfully.

17. A non-transitory computer readable storage medium, comprising instructions stored therein, which when executed, cause a processor to:

prepare, by a processor, a first area of a first storage device and a second area of a second storage device for a snapshot of a virtual disk of a virtual machine;

creating, during execution of the virtual machine, a snapshot of the virtual disk in the first area of the first storage device;

copying the snapshot of the virtual disk to the second area of the second storage device;

mirror a change of the virtual disk that occurs after the snapshot is created, wherein the mirroring comprises executing one or more write operations to the copy of the snapshot in the second area; and map, during execution of the virtual machine, the virtual disk of the virtual machine to the copy of the snapshot in the second area to enable the virtual machine to operate using the copy of the snapshot after the mirroring.

18. The non-transitory computer readable storage medium of claim 17 wherein the instructions further cause the processor to detect a failure in at least one of the copying or the mirroring.

19. The non-transitory computer readable storage medium of claim 18 wherein the instructions further cause the processor to delete, in response to the detecting the failure, the snapshot in the first area and the copy of the snapshot in the second area.

20. The non-transitory computer readable storage medium of claim 19 wherein the instructions further cause the processor to roll back, in response to the detecting the failure, the one or more write operations to the copy of the snapshot in the second area.

* * * * *